(12) United States Patent
Okada et al.

(10) Patent No.: US 12,222,697 B2
(45) Date of Patent: Feb. 11, 2025

(54) PROGRAMMABLE LOGIC CONTROLLER, SETTING TOOL, AND RECORDING MEDIUM

(71) Applicant: Mitsubishi Electric Corporation, Tokyo (JP)

(72) Inventors: Naoya Okada, Tokyo (JP); Takashi Okamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 338 days.

(21) Appl. No.: 17/616,685

(22) PCT Filed: Jul. 26, 2019

(86) PCT No.: PCT/JP2019/029491
§ 371 (c)(1),
(2) Date: Dec. 6, 2021

(87) PCT Pub. No.: WO2021/019615
PCT Pub. Date: Feb. 4, 2021

(65) Prior Publication Data
US 2022/0308548 A1 Sep. 29, 2022

(51) Int. Cl.
*G05B 19/05* (2006.01)
(52) U.S. Cl.
CPC .................. *G05B 19/054* (2013.01)
(58) Field of Classification Search
CPC ..................... G05B 19/054; G05B 19/058
See application file for complete search history.

(56) References Cited

U.S. PATENT DOCUMENTS

| 2007/0300022 | A1* | 12/2007 | Boggs | G05B 19/05 711/154 |
| 2015/0057771 | A1* | 2/2015 | Dembicki | G05B 15/02 700/83 |
| 2018/0316762 | A1* | 11/2018 | Matsumoto | H04L 67/12 |
| 2021/0311459 | A1* | 10/2021 | Nakayama | G05B 23/0264 |

FOREIGN PATENT DOCUMENTS

WO 2017/203583 A1 11/2017

OTHER PUBLICATIONS

Sato Tomoshi, "Programmable Logic Controller, Data Logger and Control Method" (machine translation of JP 2019128702A), Jan. 23, 2018, espacenet machine translations (Year: 2018).*
International Search Report and Written Opinion mailed on Oct. 29, 2019, received for PCT Application PCT/JP2019/029491, Filed on Jul. 26, 2019, 6 pages including English Translation.

* cited by examiner

*Primary Examiner* — Christopher W Carter
(74) *Attorney, Agent, or Firm* — XSENSUS LLP

(57) ABSTRACT

A differential logger stores, into a log storage from a device memory, a differential log being a log of a device value that has changed at each execution of a control program. A collective logger collectively stores, at a set time, collection target device values into the log storage as reference data to be used to collect the differential log. A split logger acquires as split logs, after the set time, logs of the device values multiple times, and stores the split logs into the reference data storage. The differential logger overwrites data in the log storage with the differential log after new reference data is stored into the log storage.

9 Claims, 12 Drawing Sheets

FIG. 6

Logging setting (manual setting)

Serial code of target PLC :　A10333

| Logging function | ● Enable | ○ Disable |

Split count to collect split logs　　[ 20 ]

Memory size of full data area　　[ 8 ] k byte

Memory size of differential data area　　[ 4 ] k byte

[ Back ]　[ Set up ]

FIG. 8

Logging setting (automatic setting)

Serial code of target PLC : A10333

| Logging function | ● Enable | ○ Disable |

Scan count to acquire logs     100   scans

Allowable increased scan time     4   milliseconds

Back    Calculate

FIG. 9

Logging setting (automatic setting)

Serial code of target PLC : A10333

Logging function                         Enable

Scan count to acquire logs              : 100

Split count to collect split logs         | 20 |

Memory size of full data area            | 14 |  k byte

Memory size of differential data area    | 4  |  k byte

| Back | Set up |

PROGRAMMABLE LOGIC CONTROLLER, SETTING TOOL, AND RECORDING MEDIUM

CROSS-REFERENCE TO RELATED APPLICATION

The present application is based on PCT filing PCT/JP2019/029491, filed Jul. 26, 2019 the entire contents of which are incorporated herein by reference.

TECHNICAL FIELD

The present disclosure relates to a programmable logic controller, a setting tool, and a recording medium.

BACKGROUND ART

A programmable logic controller that operates in a production system or a control system repeats execution of a control program to control a target device. Input data and output data for the control program are stored in an area in a memory called a device memory included in the programmable logic controller. Examples of input data include data indicating an input signal provided from a detector. Examples of output data include data indicating an output signal that is to be provided by the programmable logic controller to a control target device.

To check whether the programmable logic controller operates normally, a user may refer to the history of data stored in the device memory. The programmable logic controller may thus have the logging function of collecting logs of data stored in the device memory.

Patent Literature 1 describes a programmable logic controller having the logging function of logging input-output data at every input/output (I/O) refresh time. I/O refresh refers to data exchange between the programmable controller and a device. The programmable logic controller described in Patent Literature 1 reduces an increase in the memory size for log data by recording logs of all the input-output data pieces after the first execution of the program and then recording logs of data pieces with the values that have changed after the second and subsequent executions.

CITATION LIST

Patent Literature

Patent Literature 1: International Publication No. WO 2017/203583

SUMMARY OF INVENTION

Technical Problem

Although the programmable logic controller described in Patent Literature 1 records the logs of data pieces with the values that have changed after the second and subsequent executions of the program, the memory size used to record logs is expected to increase as logs are recorded many times. Such increased memory size used for log recording can cause insufficient memory space for the operation of the programmable logic controller, possibly stopping the programmable logic controller.

In response to the above issue, an objective of the present disclosure is to reduce errors resulting from insufficient free space in a memory due to logging.

Solution to Problem

To achieve the above objective, a programmable logic controller according to an aspect of the present disclosure collects, from device storage means, one-Nth (N is a natural number greater than or equal to two) of device values set as collection targets at each execution of a control program to generate new reference data, stores split logs being logs of the collected one-Nth of the device values into reference data storage means, and overwrites data stored in the reference data storage means with the logs of the one-Nth of the device values when no free space is left in the reference data storage means. Split logging means stores the split logs into the reference data storage means N times to store the new reference data into the reference data storage means. After the new reference data is stored into the reference data storage means, differential logging means overwrites data stored in differential log storage means with a differential log to store the differential log into the differential log storage means.

Advantageous Effects of Invention

The programmable logic controller according to the above aspect of the present disclosure with the above structure avoids a decrease in the free space in the memory of the programmable logic controller resulting from log recoding performed many times. The programmable logic controller can thus reduce errors resulting from insufficient free space in the memory due to logging.

BRIEF DESCRIPTION OF DRAWINGS

FIG. 6 is a diagram of an example logging setting screen for a setting tool in the embodiment;

FIG. 8 is a diagram of an example logging setting screen for a setting tool in a modification; and FIG. 9 is a diagram of another example logging setting screen for the setting tool in the modification.

DESCRIPTION OF EMBODIMENTS

Embodiment

A programmable logic controller according to an embodiment of the present disclosure will now be described in detail with reference to the drawings.

Figure 1:
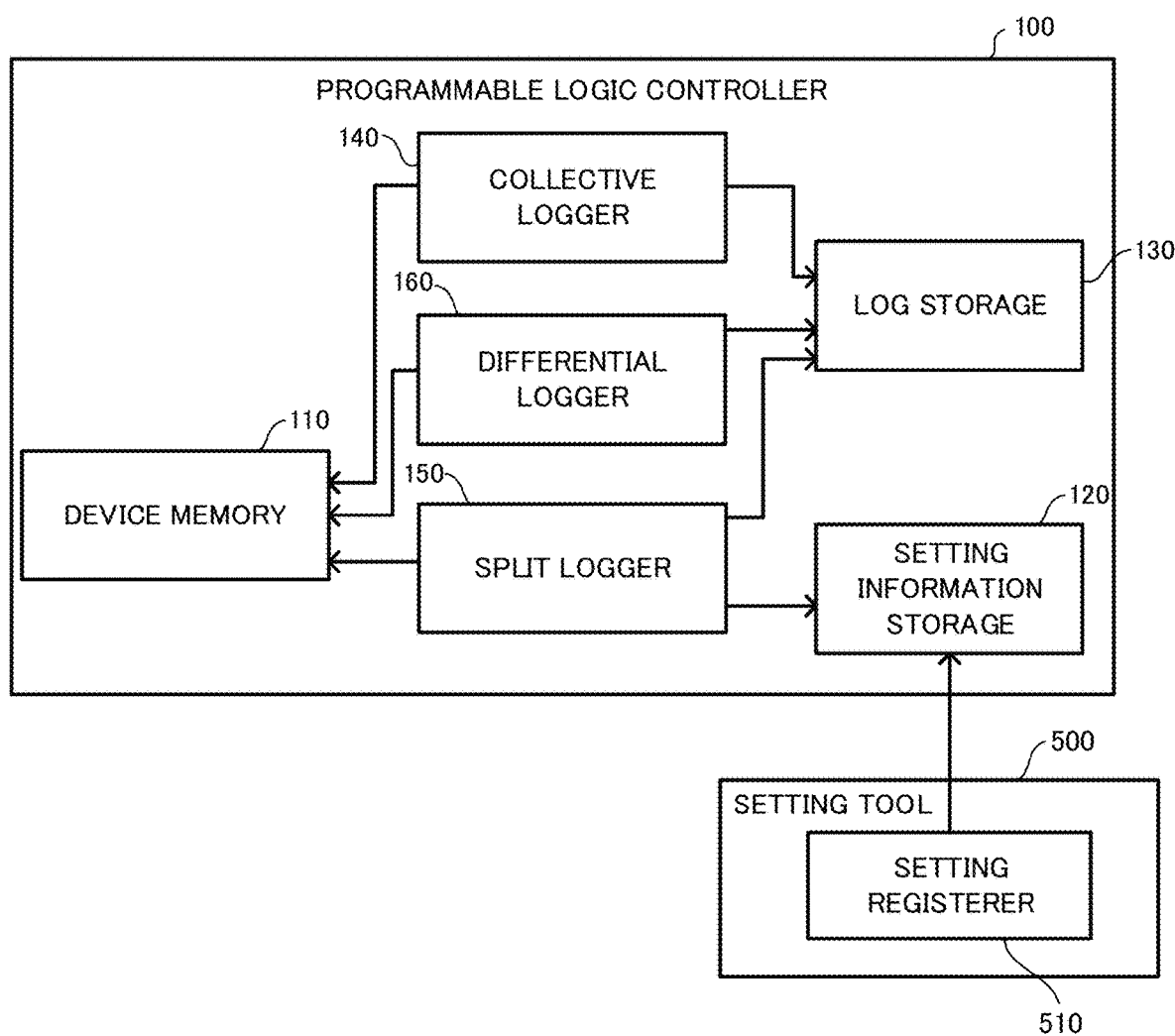
FIG. 1 is a functional block diagram of a programmable logic controller and a setting tool according to an embodiment of the present disclosure.

A programmable logic controller 100 shown in FIG. 1 executes a control program in, for example, a control system or a production system to control a target device. For example, the programmable logic controller 100 (hereafter, PLC 100) executes programmed computations using input values input from a detector such as a sensor or a switch. Each of the input values is a true or false logical value indicated by an input signal input from a detector as a sensor or a switch. The PLC 100 acquires output values through computations. Each of the output values is a true or false logical value. The PLC 100 outputs an output signal indicating the true or false logical value to a target device such as a contactor, a motor, or an indicator light. Thus, the PLC 100 controls turning on or off of the target device.

The PLC 100 sequentially executes commands in the control program from the first command to the last command. After executing an END command or the last command, the PLC 100 sequentially re-executes the commands from the first command. The execution of the control program by the PLC 100 from the first to last commands may be referred to as a scan. The time taken by the PLC 100 to execute the first to last commands, or in other words, the time taken by the PLC 100 to execute one cycle of commands in the control program may be referred to as a scan time. The scan time may also be referred to as an execution cycle. Although the PLC 100 cyclically executes the control program, the PLC 100 does not execute the control program in fixed periods.

The logical values indicated by the input signals input from the detector are stored in an area in a memory called a device memory 110 included in the PLC 100. The logical values indicating the output signals acquired by the PLC 100 through computations are also stored in the device memory 110. The control program executed by the PLC 100 is a program implementing the functions of a relay circuit. Thus, the device memory 110 also stores logical values indicating signals for turning on or off an internal relay that is a virtual relay on the program. Data stored in the device memory 110 are referred to as device values. The PLC 100 executes the programmed computations using the device values stored in the device memory 110.

The PLC 100 collectively exchanges data in the device memory 110 with data from a detector or a target device at predetermined times. This data exchange is referred to as I/O refresh. For example, the PLC 100 performs I/O refresh before executing the first command in the control program. The PLC 100 stores, into the device memory 110, the logical values indicating the input signals provided from the detector through the I/O refresh and provides the target device with the output signals acquired through the computation performed at the last scan time stored in the device memory 110.

In the embodiment, the PLC 100 has the function of logging the device values. When the logging function is enabled, the PLC 100 collects device values stored in the device memory 110 and records the logs of the device values. In the embodiment, the PLC 100 has the structure described below. Before executing the control program, the PLC 100 collectively records logs of the device values as collection target stored in the device memory 110 into a predetermined area in the memory. At each of multiple separate scan times, the PLC 100 further acquires split logs of the collection target device values stored in the device memory 110. Additionally, the PLC 100 logs, at each scan time, device values that have changed.

A setting tool 500 is used by a user to set the setting values for the logging process with the PLC 100. For example, the setting tool 500 includes a personal computer installed in the same factory as the PLC 100 and incorporating a dedicated program.

Figure 2:
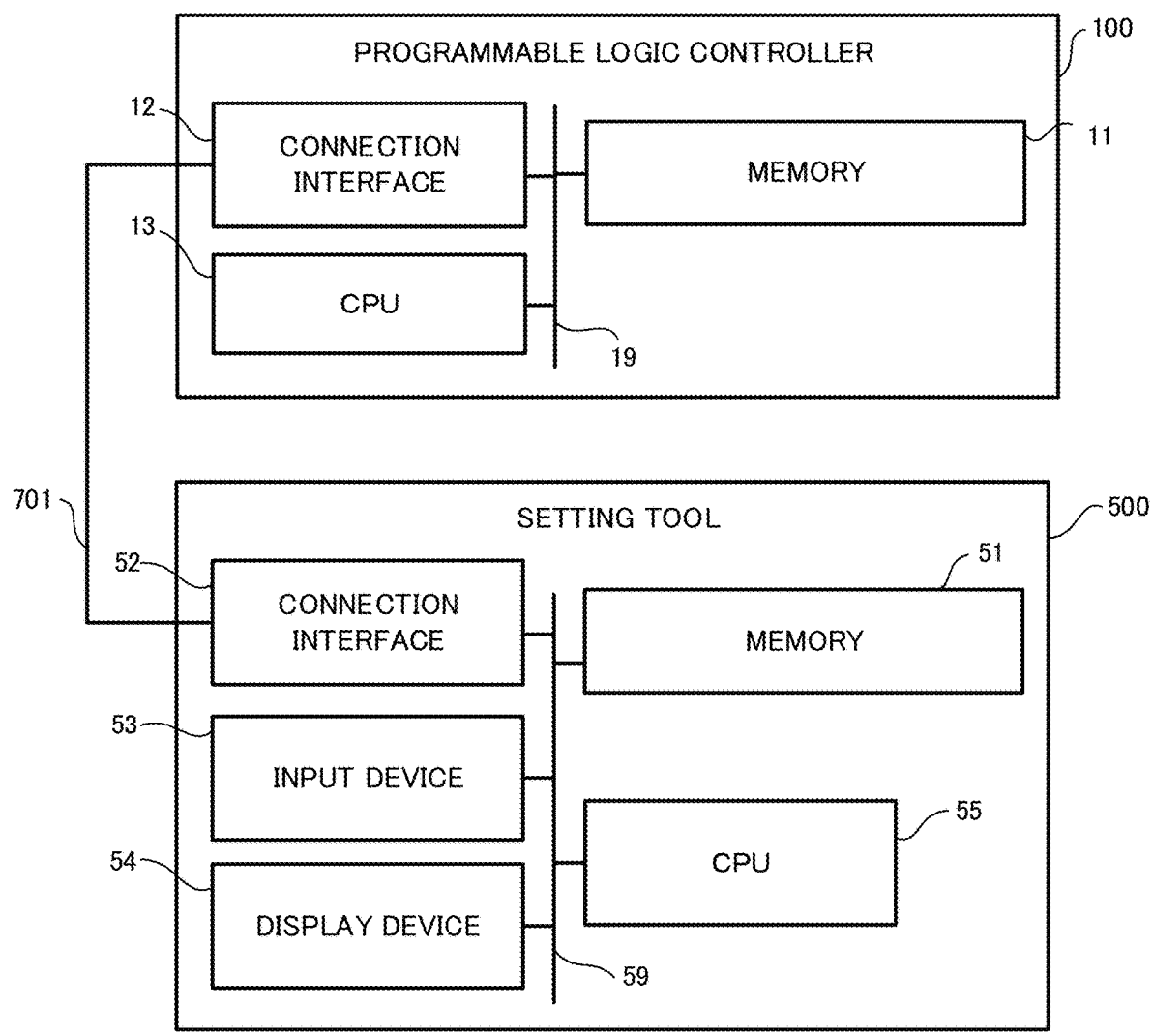
FIG. 2 is a diagram of the programmable logic controller and the setting tool according to the embodiment, showing the hardware structure.

The hardware structure of each apparatus will now be described. As shown in FIG. 2, the PLC 100 includes, as hardware components, a memory 11 that stores various programs and data, a connection interface 12 that transmits and receives data to and from the setting tool 500 through a communication cable 701, and a central processing unit (CPU) 13 that centrally controls the PLC 100. The memory 11 and the connection interface 12 are connected to the CPU 13 with a bus 19 to communicate with the CPU 13.

The memory 11 includes a volatile memory and a non-volatile memory. The memory 11 stores programs for implementing various functions of the PLC 100 and data used to execute the programs. The programs stored in the memory 11 include firmware and control programs for controlling a control target device. In the embodiment, the firmware implements the logging function of the PLC 100. The memory 11 is used as a work memory for the CPU 13.

The connection interface 12 includes, for example, a universal serial bus (USB) controller. The connection interface 12 receives electric signals output from the setting tool 500 through the communication cable 701 and reconstructs the received electric signals into data to output to the CPU 13. The communication cable 701 is, for example, a USB cable. The connection interface 12 converts data provided from the CPU 13 into electric signals and outputs the resultant signals to the setting tool 500 through the communication cable 701.

The CPU 13 executes the programs stored in the memory 11 to implement various functions of the PLC 100. For example, the CPU 13 executes the control programs stored in the memory 11 to perform computations using values indicated by the input signals provided from the detector.

The setting tool 500 includes, as hardware components, a memory 51 that stores various programs and data, a connection interface 52 that transmits and receives data to and from the PLC 100 through the communication cable 701, an input device 53 that detects input operations of a user, a display device 54 that outputs images, and a CPU 55 that centrally controls the setting tool 500. The memory 51, the connection interface 52, the input device 53, and the display device 54 are connected to the CPU 55 with a bus 59 to communicate with the CPU 55.

The memory 51 includes a volatile memory and a non-volatile memory. The memory 51 stores programs for implementing various functions of the setting tool 500 and data used to execute the programs. The programs stored in the memory 51 include a setting program for implementing the function of setting data for the logging process with the PLC 100. The memory 51 is also used as a work memory for the CPU 55.

The connection interface 52 includes, for example, a USB controller. The connection interface 52 converts data provided from the CPU 55 into electric signals and outputs the resultant signals to the PLC 100 through the communication cable 701. The connection interface 52 receives the electric signals output from the PLC 100 through the communication cable 701 and reconstructs the received electric signals into data to output to the CPU 55.

The input device 53 includes, for example, a mouse and operation keys. The input device 53 receives operation inputs from the user and outputs signals indicating the operation inputs from the user to the CPU 55. The display device 54 includes a display and displays an image based on the signal provided from the CPU 55 on the display.

The CPU 55 executes the programs stored in the memory 51 to implement various functions of the setting tool 500. More specifically, the CPU 55 executes the setting program stored in the memory 51 to register setting information for the logging process with the PLC 100.

The functional components of the PLC 100 will now be described with reference to FIG. 1. The PLC 100 functionally includes the device memory 110 that stores device values, a setting information storage 120 that stores setting information on the logging process, a log storage 130 that stores logs of the device values, a collective logger 140 that collectively collects logs of the device values at a set time, a split logger 150 that splits and collects the logs of the device values during execution of the program, and a differential logger 160 that collects the logs of the device values that has changed.

The device memory 110 stores device values. The device values include logical values indicated by input signals provided from a detector, logical values indicating output signals acquired through computations, and logical values indicating signals for turning on or off the internal relay. The functions of the device memory 110 are implemented by the memory 11 shown in FIG. 2. The device memory 110 is an example of device storage means in an aspect of the present disclosure.

The setting information storage 120 stores setting information for the logging process. The setting information storage 120 stores a value indicating whether the logging function is to be enabled or disabled. When this value indicates that the logging function is to be enabled, the PLC 100 performs logging. The setting information storage 120 stores information specifying the device values to be collected.

The log storage 130 stores the logs of the device values. The functions of the log storage 130 are implemented by the memory 11 shown in FIG. 2.

Figure 3A:
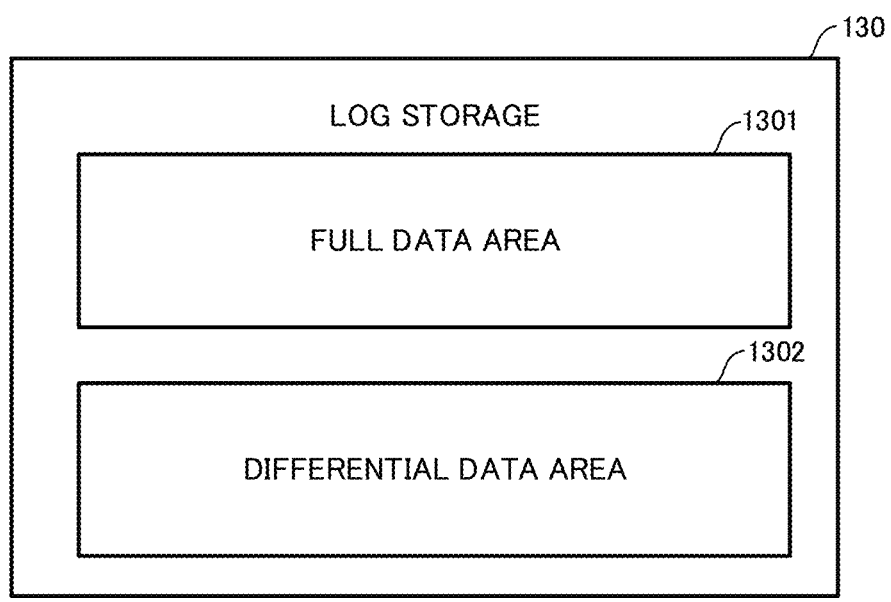
FIG. 3A is a diagram of an example log storage in the embodiment.
Figure 3B:
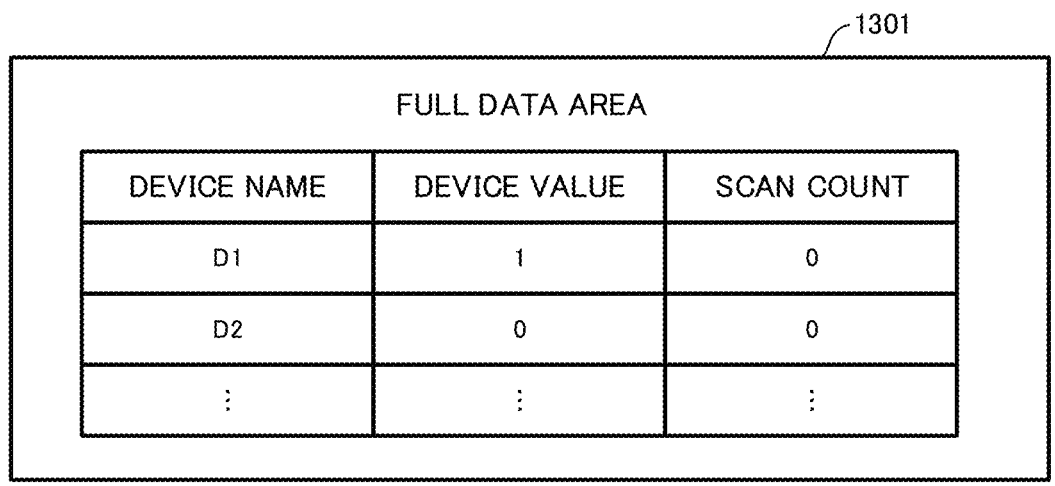
FIG. 3B is a table of example data stored in a full data area in the embodiment.

As shown in FIG. 3A, the log storage 130 includes a full data area 1301 and a differential data area 1302. The full data area 1301 stores the logs of the collection target device values collectively collected before the control program is executed and split logs of the collection target device values recorded at multiple scan times. As shown in FIG. 3B, the full data area 1301 stores the device name, the device value, and the scan count at the time. The scan count indicates the number of times the control program is scanned. The scan count for the data stored in the full data area 1301 is, for example, zero before the control program is executed. Once the execution of the control program is started, the scan count is incremented by one. Although the user can set the size of the full data area 1301 as appropriate, the set size is to be large enough to store the collection target device values. In the example described below, the size of the full data area 1301 is twice the size for storing all the collection target device values. Instead of twice the size for storing all the collection target device values, the size of the full data area 1301 may be three times or four or more times the size. Instead of a positive integral multiple of the size for storing all the collection target device values, the size of the full data area 1301 may be set to any size as appropriate. The full data area 1301 is an example of reference data storage means in an aspect of the present disclosure.

Figure 3C:
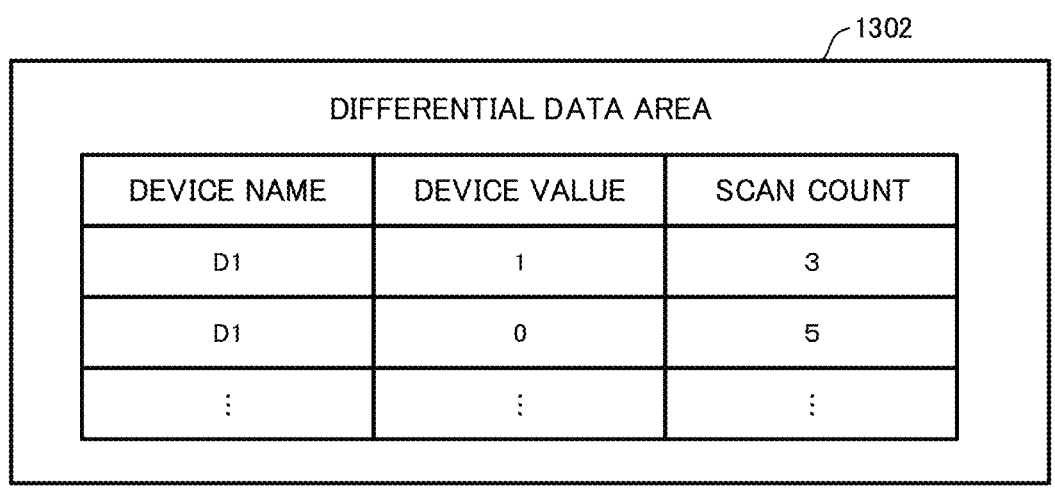
FIG. 3C is a table of example data stored in a differential data area in the embodiment.

The differential data area 1302 stores differential logs of the collection target device values, or the logs of the device values that are changed. As shown in FIG. 3C, the differential data area 1302 stores the device name, the device value, and the scan count at the time. Each device value is a device value that has changed. The differential data area 1302 is an example of differential log storage means in an aspect of the present disclosure.

In addition to logging, the collective logger 140 shown in FIG. 1 prepares for the logging. For example, the collective logger 140 performs a preparation process before starting the control program.

The preparation process will now be described. The collective logger 140 reads the setting values set by the user from the predetermined area in the memory 11 and stores the read setting values into the setting information storage 120. The user prestores the setting values into the predetermined area in the memory 11 in the PLC 100 using the setting tool 500. The setting values include the size of the full data area 1301, the size of the differential data area 1302, and the split count N indicating the number of times to acquire split logs. The split count N is a natural number greater than or equal to two.

The collective logger 140 allocates the set sizes to the full data area 1301 and the differential data area 1302 in the log storage 130. The collective logger 140 calculates the number of device values to be collected by the split logger 150 (described later) at a time based on the split count N specified by the user and setting data about the device values prestored in the memory 11, and stores the calculated values into the setting information storage 120.

The collective logger 140 collects, at the set times, the collection target device values stored in the device memory 110. In the example described below, the collective logger 140 collects the collection target device values stored in the device memory 110 before the control program starts being executed.

More specifically, the collective logger 140 collectively stores, into the full data area 1301, data of all the collection target device values stored in the device memory 110 in an initial process executed after the PLC 100 is turned on. As shown in FIG. 3B, the collective logger 140 stores the device name, the device value, and the scan count into the full data area 1301. In this state, the PLC 100 has not started execution of the control program, and thus the collective logger 140 sets the scan counts at zero.

Data stored by the collective logger 140 into the full data area 1301 before the control program starts being executed is used as reference data for collecting the differential logs. The differential logger 160 (described later) uses the reference data to determine whether the device values are changed when collecting the differential logs.

Figure 5A:
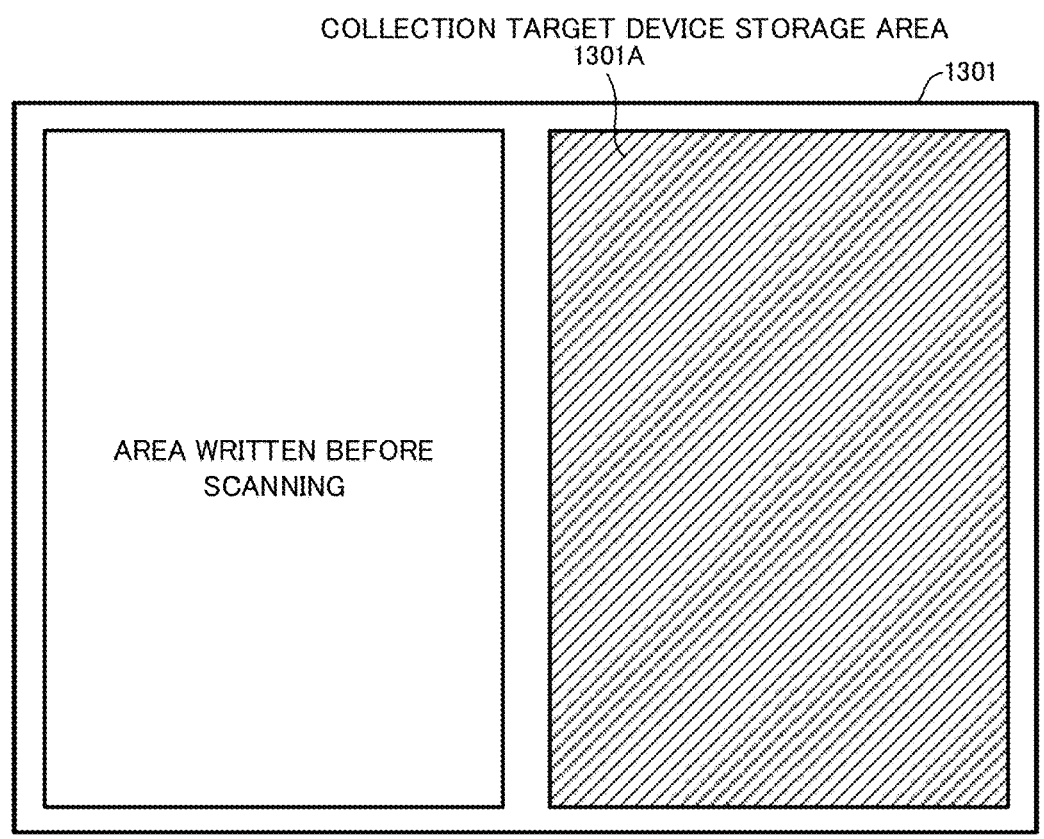
FIG. 5A is a diagram of the full data area in the embodiment, storing data written before scanning.

As described above, in the embodiment, the size of the full data area 1301 is set to twice the size for storing all the collection target device values. When the collective logger 140 stores the collection target device values in the device memory 110 into the full data area 1301 in the initial process, half the full data area 1301 is used as shown in FIG. 5A. In FIG. 5A, the hatched area is a free area and is referred to as a collection target device storage area 1301A. The functions of the collective logger 140 are implemented by the CPU 13 shown in FIG. 2. The collective logger 140 is an example of collective logging means in an aspect of the present disclosure.

In the embodiment, the collective logger 140 collects the reference data before the control program starts being executed. The collective logger 140 collectively collects the collection target device values as the reference data. This collection process takes a certain amount of time. A longer time taken to collect the reference data increases the scan time. To avoid an increase in the scan time in the embodiment, the collective logger 140 collects the reference data before the control program starts being executed. However, the collective logger 140 may collect the reference data at times other than before the control program starts being executed. The collective logger 140 may collect the reference data after the control program starts being executed but before logging is started.

After the start of execution of the control program, the split logger 150 shown in FIG. 1 acquires the logs of the collection target device values stored in the device memory 110 at multiple scan times. More specifically, when the END command is executed at each scan time, the split logger 150 stores, into the full data area 1301, the logs of one-Nth of the collection target device values stored in the device memory 110. The logs stored into the full data area 1301 by the split logger 150 include the device name, the device value, and the scan count at the time. The logs collected by the split logger 150 and stored into the full data area 1301 may be referred to as split logs.

Figure 4:
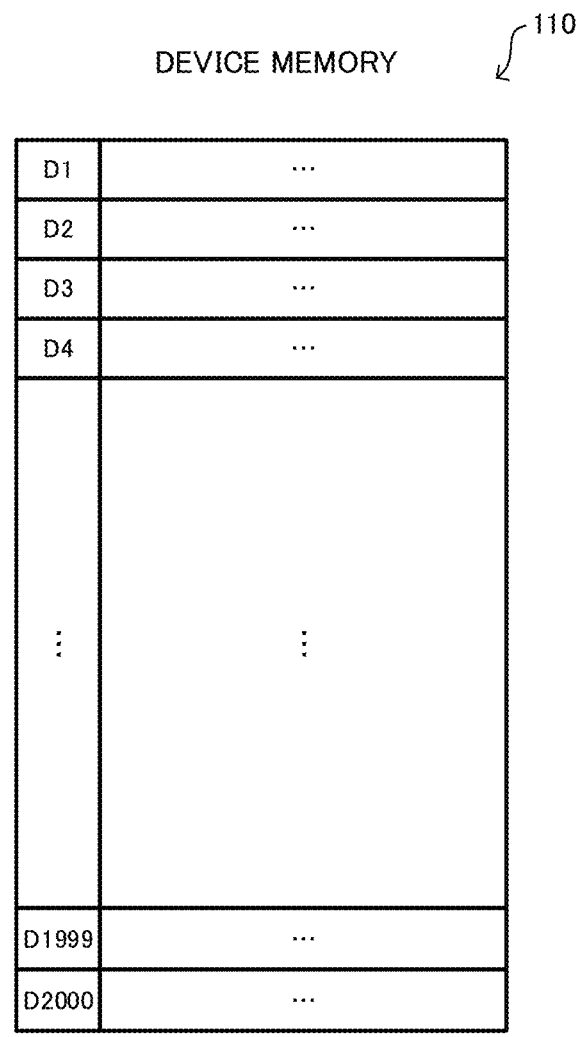
FIG. 4 is a diagram of an example device memory in the embodiment.

The number of device values collected by the split logger 150 at a time is determined in the manner described below. As described above, the collective logger 140 calculates the number of device values collected by the split logger 150 at a time in the preparation process. For example, as shown in FIG. 4, the device memory 110 stores device values D1 to D2000, and all the values D1 to D2000 are collection targets. In this case, the number of data pieces for device values is 2000. The split count N is set to 20, and the device values D1 to D2000 have the same data size. In this case, the split logger 150 may collect 100 device values in the device memory 110 at each scan time.

Figure 5B:
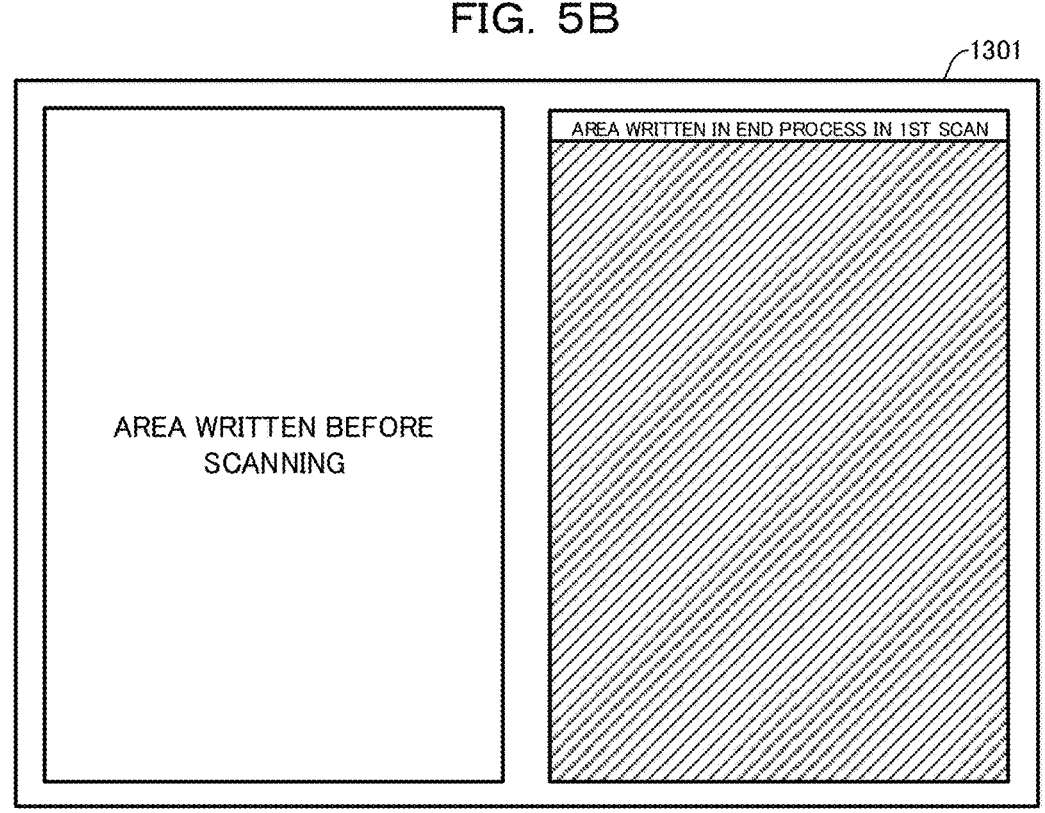
FIG. 5B is a diagram of the full data area in the embodiment, storing data written after a first scan.
Figure 5C:
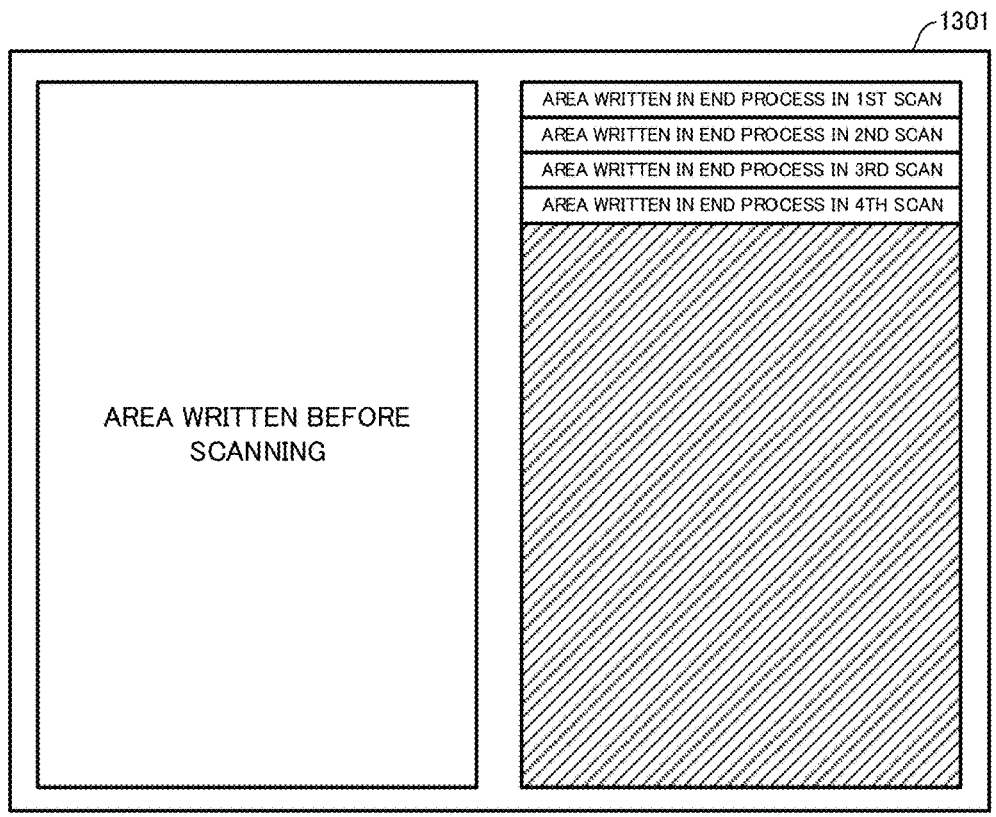
FIG. 5C is a diagram of the full data area in the embodiment, storing data written in multiple scans.

Thus, as shown in FIG. 5B, the split logger 150 stores the logs of the device values D1 to D100 into the full data area 1301 in the first scan. In the first scan, the collection target device storage area 1301A in the full data area 1301 is available, and thus the split logger 150 stores the logs of the device values into the collection target device storage area 1301A. In second scan, the split logger 150 stores the logs of the device values D101 to D200 into the collection target device storage area 1301A in the full data area 1301. As shown in FIG. 5C, when the collection target device storage area 1301A is available, the split logger 150 stores the logs of one hundred device values into the collection target device storage area 1301A in each scan. When storing the device values into the full data area 1301, the split logger 150 is to store information specifying device values to be collected at the subsequent scan time and information specifying the location in the full data area 1301 into which data is to be written at the subsequent scan time. The functions of the split logger 150 are implemented by the CPU 13 shown in FIG. 2. The split logger 150 is an example of split logging means in an aspect of the present disclosure.

Figure 5D:
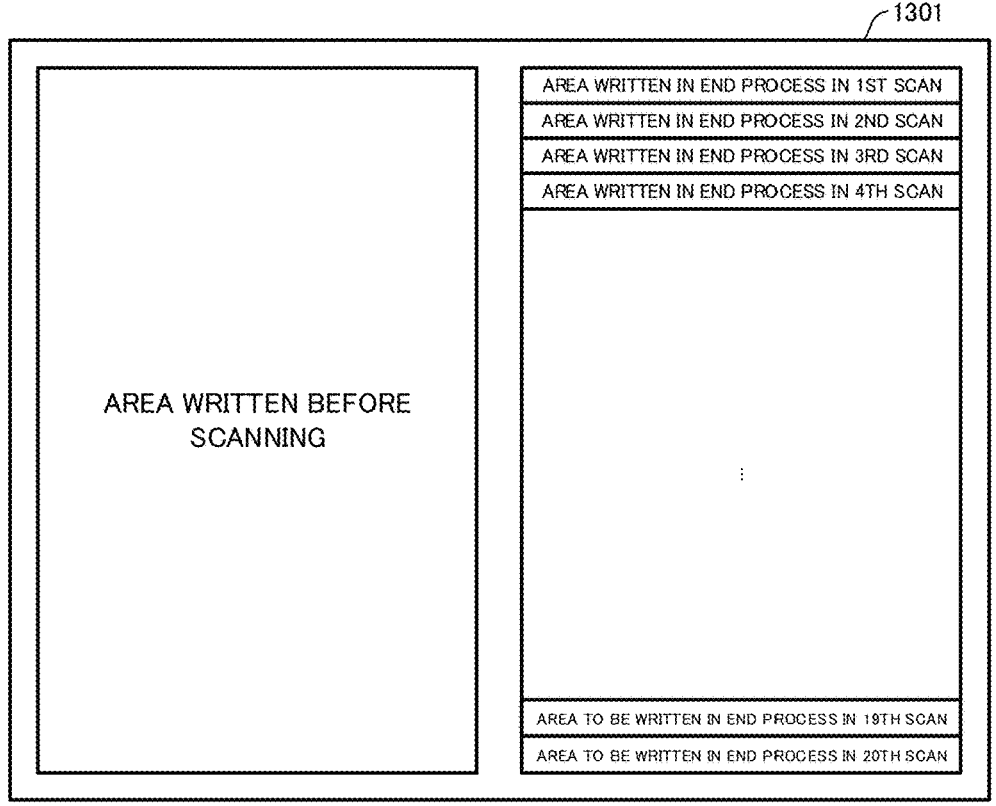
FIG. 5D is a diagram of the full data area in the embodiment, with the entire area written with data.
Figure 5E:
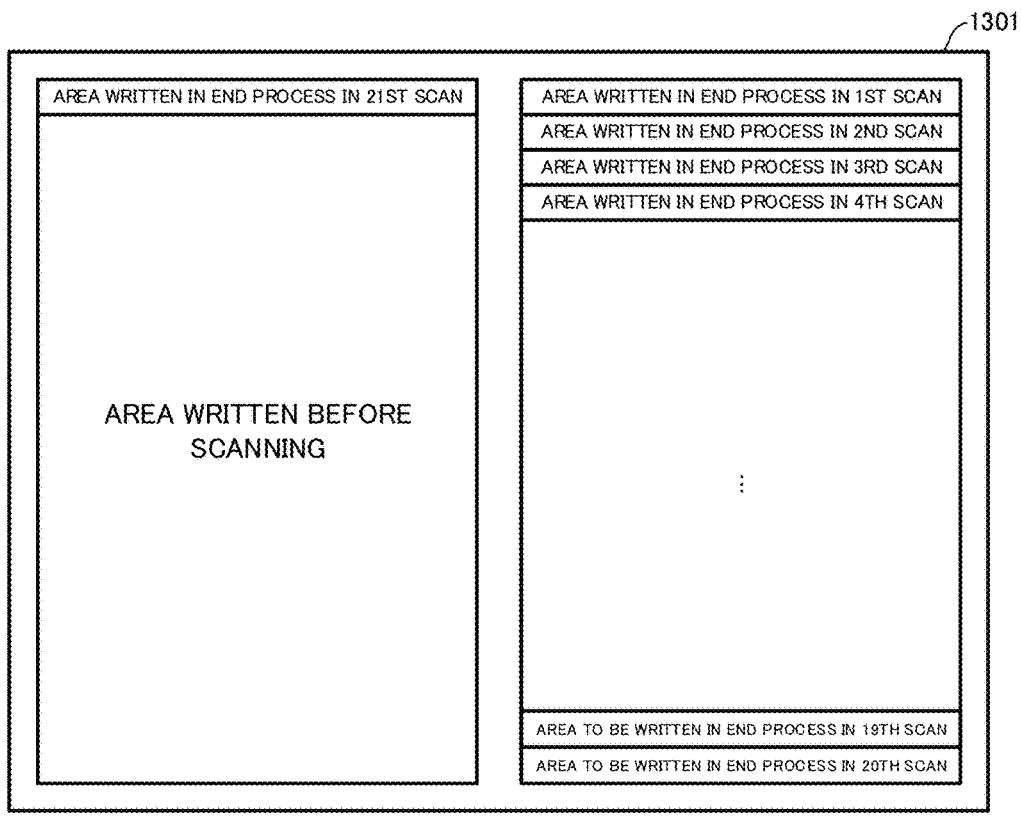
FIG. 5E is a diagram of the full data area in the embodiment, with the data stored in the full data area being overwritten.

When no free space is left in the collection target device storage area 1301A, the split logger 150 stores split logs into the full data area 1301 by overwriting the oldest data stored in the full data area 1301. For example, as shown in FIG. 5D, after the split logger 150 stores the logs of the device values into the collection target device storage area 1301A at the 20th scan time, no free space is left in the collection target device storage area 1301A. In this case, as shown in FIG. 5E, the split logger 150 stores logs into the full data area 1301 at the 21st scan time by overwriting the data written before the control program starts being executed.

As described above, the data stored by the collective logger 140 into the full data area 1301 before the control program started being executed is used as the reference data for collecting the differential logs. The data is overwritten after the scan count exceeds 20. In this case, the logs of the device values stored by the split logger 150 into the full data area 1301 at the first to 20th scan times are used as new reference data.

Figure 5F:
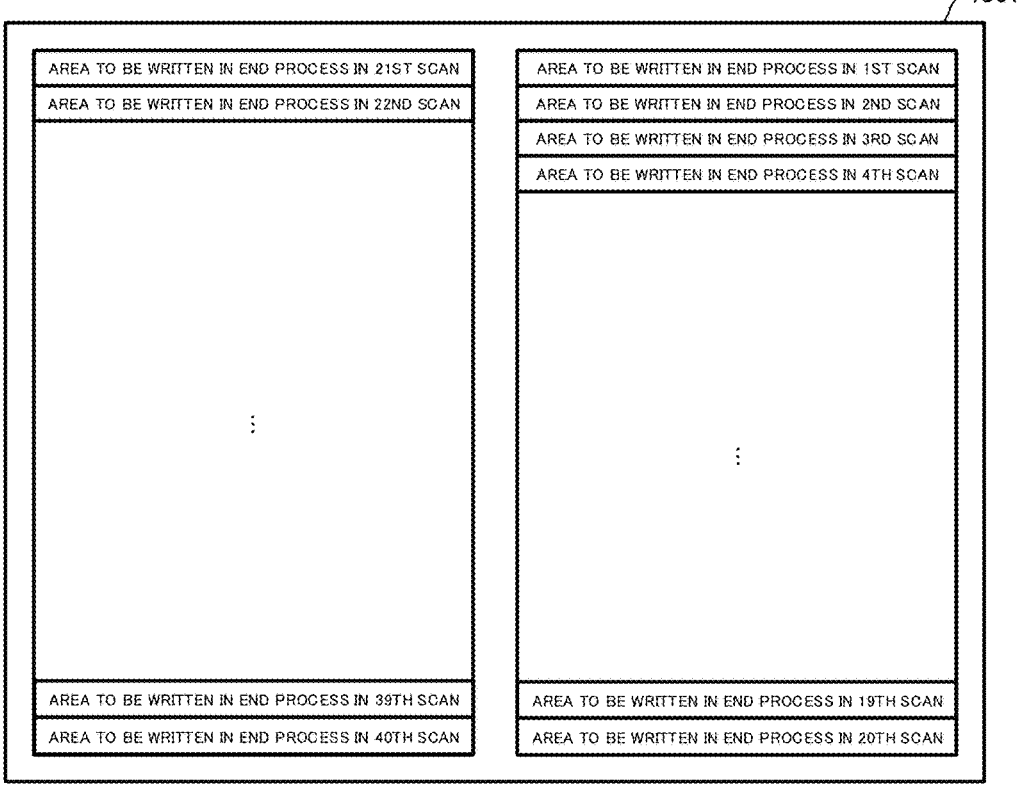
FIG. 5F is a diagram of the full data area in the embodiment, after a (2×N)th scan.

After storing data at the 40th scan time as shown in FIG. 5F, the split logger 150 overwrites the data stored at the first scan time in the full data area 1301 at the 41st scan time. Data stored in the full data area 1301 in the first and subsequent scans is thus overwritten. In this case, the logs of the device values stored by the split logger 150 into the full data area 1301 at the 21st to 40th scan times are used as new reference data.

As described above, the split logger 150 records the logs of the collection target device values used as the reference data at N separate times. The split logger 150 with this structure has the advantages described below. The logs recorded by the split logger 150 at one scan time are the logs of one-Nth of the collection target device values. Thus, the amount of data stored at one scan time is smaller than the amount of the logs of all the collection target device values recorded at a time. Thus, the process time taken to record the logs is shorter than the time taken to record the logs of all the collection target device values at a time. The time taken to record the logs are not long, and thus does not increase the scan time taken to record logs.

When, for example, the scan time increases due to the recording process of the logs beyond an allowable range, the process of the PLC 100 is delayed and adversely affects the operation of the entire system. Thus, the split logger 150 records the logs of the collection target device values at N separate times in the embodiment.

When the END command in the control program is executed, the differential logger 160 shown in FIG. 1 determines whether any of the collection target device values in the device memory 110 has changed, and stores the logs of resultant device values into the differential data area 1302. The functions of the differential logger 160 are implemented by the CPU 13 shown in FIG. 2. The differential logger 160 is an example of differential logging means in an aspect of the present disclosure.

The differential logger 160 first determines whether the differential logs of the collection target device values are stored in the differential data area 1302. When determining that the differential logs of the collection target device values are stored in the differential data area 1302, the differential logger 160 determines whether the latest device value stored in the differential data area 1302 matches the corresponding device value in the device memory 110. When the two device values do not match, the differential logger 160 determines that the device value has changed.

When determining that no differential log of the collection target device value is stored in the differential data area 1302, the differential logger 160 determines whether the device value included in the reference data stored in the full data area 1301 matches the corresponding device value in the device memory 110. When the two device values do not match, the differential logger 160 determines that the device value has changed.

When determining that the device value has changed, the differential logger 160 stores, as differential logs, the device name, the device value stored in the device memory 110, and the scan count at the time into the differential data area 1302. In the example shown in FIG. 3C, the differential logger 160 determines that the value for the device D1 has changed at the third scan time, and stores the differential log for the device D1 into the differential data area 1302. The differential logger 160 determines that the value for the device D1 has changed at the fifth scan time, and stores the differential log for the device D1 into the differential data area 1302.

In the embodiment, the differential logger 160 overwrites the old differential logs upon replacement of the reference data. As described above, the data in the full data area 1301 is overwritten in the (M×N)+1-th and subsequent scans (M is a natural number greater than or equal to 1). At this time, the reference data is replaced with new reference data. The differential logs collected before the new reference data is generated are not to be used.

The functional components of the setting tool 500 will now be described. As shown in FIG. 1, the setting tool 500 functionally includes a setting registerer 510 that registers setting values for the logging process with the PLC 100.

The setting registerer 510 causes the display device 54 to display, for example, a logging setting screen shown in FIG. 6. The user sets, using the setting tool 500, whether to enable the logging function, the split count for splitting the logs for collection, the size of the full data area 1301, and the size of the differential data area 1302 with the PLC 100. The split count indicates the split count N that is the number of times the split logger 150 in the PLC 100 splits the logs of the collection target device values for collection. The user operates the input device 53 to input whether to enable or disable the logging function, the split count, the size of the full data area 1301, and the size of the differential data area 1302, and presses a setup button. In response to this, the setting registerer 510 writes the values input by the user into the predetermined area in the memory 11 in the PLC 100.

The entire sequence of the logging process in the PLC 100 will now be described. The CPU 13 in the PLC 100 executes the firmware to function as the collective logger 140, the split logger 150, and the differential logger 160 shown in FIG. 1. In the example describe below, all the device values in the device memory 110 are set as collection targets.

The user operates a switch in the PLC 100 to start the operation of the PLC 100. The PLC 100 thus starts the initial process.

Figure 7:
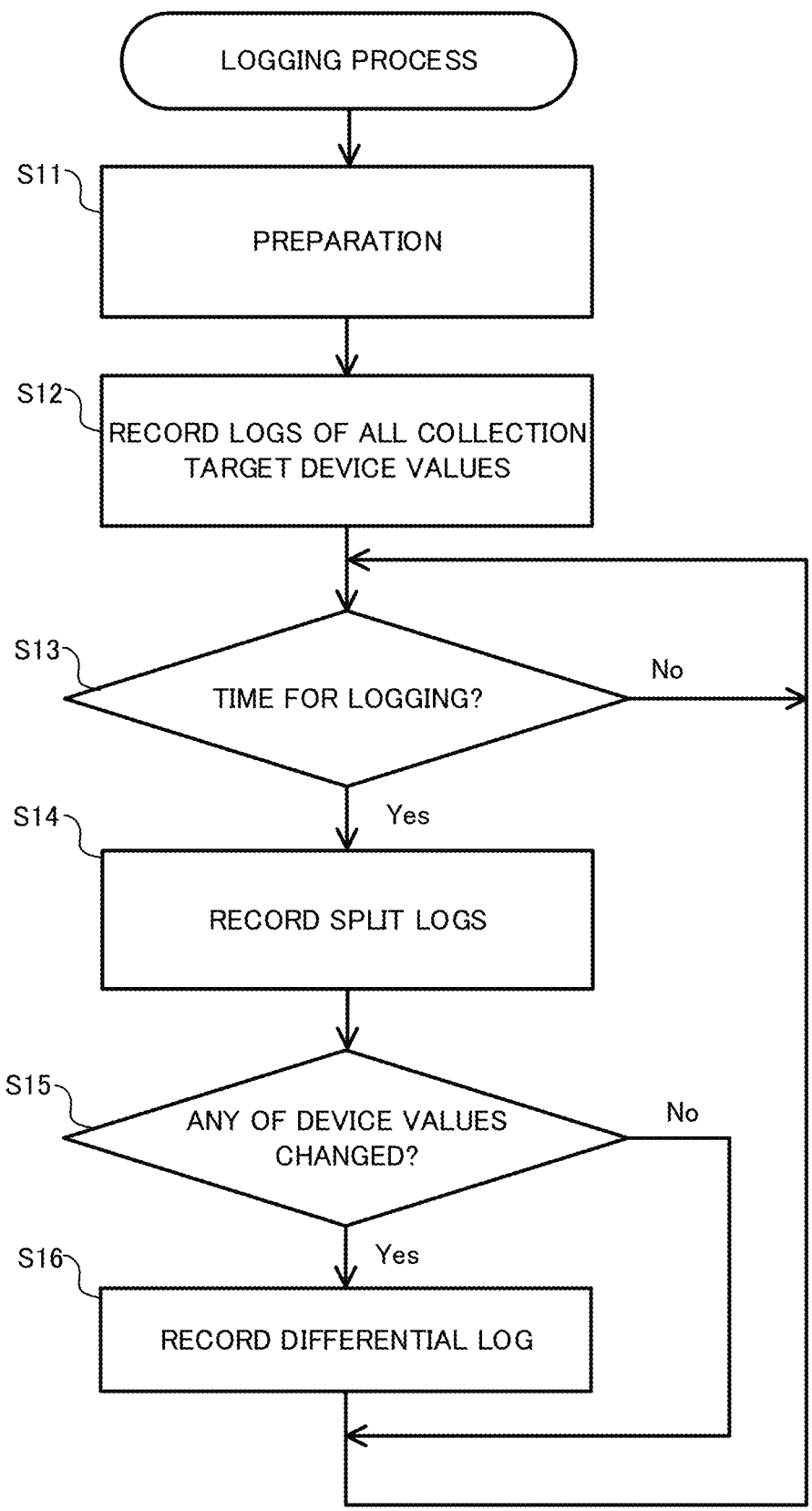
FIG. 7 is a flowchart of a logging process in the embodiment.

As shown in FIG. 7, the collective logger 140 prepares for the logging process in the initial process (step S11). More specifically, in the initial process, the collective logger 140 reads the split count N from the predetermined area in the memory 11 and stores the split count N into the setting information storage 120. The collective logger 140 further reads a definition value of the size of the full data area 1301 and a definition value of the size of the differential data area 1302 from the predetermined area in the memory 11, and allocates the set sizes to the full data area 1301 and the differential data area 1302 in the log storage 130.

As shown in FIG. 5A, in the initial process, the collective logger 140 stores the logs of all the collection target device values in the device memory 110 into the full data area 1301 as reference data (step S12). After the initial process, the PLC 100 starts execution of the control program.

The split logger 150 determines whether the logging time has come (step S13). When the END command is executed, the split logger 150 determines that the logging time has come (Yes in step S13) and stores the split logs or the logs of one-Nth of the collection target device values into the full data area 1301 (step S14). To store the split logs into the full data area 1301, the split logger 150 overwrites the oldest split logs stored in the full data area 1301 in the (M×N)+1-th and subsequent scans (M is a natural number greater than or equal to 1).

Subsequently, the differential logger 160 determines whether any of the collection target device values has changed (step S15). When determining that at least one of the collection target device values has changed (Yes in step S15), the differential logger 160 records the differential log (step S16). After the reference data is replaced with new reference data, the differential logger 160 overwrites the differential log recorded before the new reference data is generated.

After the subsequent scan in the control program ends, the split logger 150 and the differential logger 160 perform the processing in step S13 and the subsequent steps again.

As described above, in the structure in the embodiment, the PLC 100 collects the logs of the collection target device values in the device memory 110 at N separate times and stores the collected device values into the full data area 1301. The logs collected at N separate times are used as reference data for collecting the differential data. When no free area is left in the full data area 1301, the PLC 100 overwrites the oldest logs stored in the full data area 1301. The amount of data stored in the full data area 1301 thus remains within the set size.

The PLC 100 collects the device values determined to have the values changed from the reference data as the differential logs. When new reference data is stored in the full data area 1301, the PLC 100 overwrites the differential logs stored in the differential data area 1302 and collected before the new reference data is generated. The area size of the differential data area 1302 is to be set as appropriate based on the number of collection-target device values, the size of the device values, and the size of the split count N. Data in the differential data area 1302 is overwritten after the reference data stored in the full data area 1301 is replaced with new reference data. Thus, the amount of data stored in the differential data area 1302 remains within the set size.

The PLC 100 with the above structure stores the split logs without using the memory space larger than the set size. The memory space for storing the differential logs also remains within the set size. Thus, logging does not cause insufficient free space in the memory and reduces errors resulting from insufficient memory space.

The structure in the embodiment allows reproducing the history of the device values from the reference data and the differential logs. After replacement with new reference data, the history of the device values collected before replacement of the reference data is unreproducible. However, the user can acquire the history of the intended device values by appropriately setting the size of the full data area 1301 and the split count N based on the period intended by the user to acquire the history of the device values.

The PLC 100 collects the collection target device values in the device memory 110 at N separate times. For example, all the collection target device values have the same size. The number of device values for recording the split logs is one-Nth of the number of device values for recording the logs in a collective manner. This uses a shorter time for recording the logs than when all the logs of the collection target device values are recorded in a single scan. Thus, logging is less likely to increase the scan time. At each scan time, the logging process simply records the logs of one-Nth of the device values and the differential logs. The CPU 13 in the PLC 100 is thus less likely to increase the processing load.

Modifications

In the embodiment, the user sets the split count N. Instead, the setting registerer 510 in the setting tool 500 may calculate the split count N. The main structure in the modifications will be described below. For example, the setting registerer 510 causes the display device 54 to display a screen for condition setting shown in FIG. 8. In this case, the user simply operates the input device 53 to set the scan count for logging and an allowable increase in the scan time.

The setting registerer 510 in the setting tool 500 calculates the split count N in the manner described below. The theoretical value of the split count N at which the log storage 130 uses a minimum space is indicated with Formula 1.

$$N = \sqrt{\frac{C}{D}(S-1)},\quad\text{Formula 1}$$

where N is the split count, C is the memory size for the collection target device values, D is a predictive memory size for the differential logs, and S is the scan count for logging.

The memory size C is the size of the memory space used to store the collection target device values set by the user. The memory size C for the collection target device values is calculated from the number of collection target device values specified by the user and the data size of each device value. The predictive memory size D for the differential logs is a predictive memory size used to store the differential logs collected in one scan. The predictive memory size D used to store the differential logs collected in one scan is calculated from, for example, statistical data based on past logging. The scan count S for logging is set by the user.

The scan time is longer when the PLC 100 executes the logging process than when the PLC 100 executes no logging process. This increase in the scan time is to be within the range allowable by the user. Thus, the split count N is determined to maintain the time taken to store the split logs and the differential logs collected in each scan into the log storage 130 within the allowable increase in the scan time set by the user.

The allowable increase in the scan time set by the user is T (sec), and the rate at which data is stored in the log storage 130 (data transfer rate) is A (bps). In this case, the size of data storable in the log storage 130 within the allowable increased scan time is TA (bit). The split logs and the differential logs are recorded in each scan. Thus, the split count N is to satisfy Formula 2 below.

$$N \geq C/(TA-D)\quad\text{Formula 2}$$

In Formula 2, N is the split count, C is the memory size used by the collection target device values, D is the predictive memory size used by the differential logs, T is the allowable increase in the scan time, and A is the rate at which data is stored into the log storage 130.

The allowable increased scan time T is set by the user. The rate at which data is stored into the log storage 130 is the data transfer rate of the storage device in the PLC 100. For example, the data transfer rate is described in the specifications.

The allowable increased scan time T is to satisfy Formula 3 below.

$$T \geq D/A\quad\text{Formula 3}$$

The setting registerer 510 calculates the split count N at which the log storage 130 uses a minimum space based on Formula 1. More specifically, the setting registerer 510 first calculates the memory size C for the collection target device values based on the number of collection target device values and the data size of each device value. The predictive memory size D for the differential logs is prestored in the predetermined area in the memory 51. The scan count S for logging is input by the user on the screen shown in FIG. 8. The setting registerer 510 then calculates the split count N using Formula 1.

The setting registerer 510 determines the split count N calculated using Formula 1 to satisfy Formulas 2 and 3. The allowable increased scan time T is input by the user on the screen shown in FIG. 8. The rate A at which data is stored into the log storage 130 is prestored in the predetermined area in the memory 11. The setting registerer 510 stores the determined split count N into the predetermined area in the memory 51.

Before calculating the split count N, the setting registerer 510 determines whether the allowable increase in the scan time input by the user on the screen shown in FIG. 8 satisfies Formula 3. When determining that the input allowable increase in the scan time does not satisfy Formula 3, the setting registerer 510 causes the display device 54 to display a message indicating that the user is to change the allowable scan time increase. In this case, the user is to change the allowable scan time increase by operating the input device 53.

The setting registerer 510 calculates the memory size of the full data area 1301 from the calculated split count N. The memory size M of the full data area 1301 can be calculated with the formula below.

$$M = \left(\frac{C}{N} + D\right) \times (N + S - 1)\quad\text{Formula 4}$$

In Formula 4, N is the split count, C is the memory size for the collection target device values, D is the predictive memory size for the differential logs, and S is the scan count for logging.

The setting registerer 510 stores the calculated memory size M into the predetermined area in the memory 51. For example, when the split count N is the same as the scan count S to be acquired, the memory size M is substantially twice the memory size C of the collection target device values.

The setting registerer 510 calculates the memory size of the differential data area 1302 from the predictive memory size D for the differential logs and the set scan count and stores the calculated memory size into the predetermined area in the memory 51. The setting registerer 510 then displays the parameters indicating the calculated logging settings on the screen shown in FIG. 9.

For example, when the user determines that the calculated split count N and the memory sizes of the full data area 1301 and the differential data area 1302 are acceptable, the user presses the setup button to provide the instruction to write the logging setting onto the PLC 100, with the setting tool 500 connected to the PLC 100 with the communication cable 701. The setting registerer 510 writes the parameters indicating the logging setting stored in the memory 51 into the predetermined area in the memory 11 in the PLC 100. When the user intends to change the split count N and the memory sizes of the full data area 1301 and the differential data area 1302 appearing on the screen shown in FIG. 9, the user presses a back button. In response to this, the setting registerer 510 displays the screen shown in FIG. 8 again. In this case, the user can change the scan count for logging and the allowable scan time increase on the screen shown in FIG. 8.

In the structure in the modification, the user simply sets the scan count for acquiring the logs and the allowable scan time increase without determining the split count.

As in the embodiment, the structure in the modification also allows the memory size used for storing the split logs to remain within the set size. The memory size used for storing the differential logs also remains with the set size. Thus, the logging does not cause insufficient free space in the memory. This structure thus reduces errors resulting from insufficient memory space.

As in the embodiment, the time taken to record the logs is shorter than when all the logs of the collection target device values are recoded in one scan. Thus, logging is less likely to increase the scan time. The CPU 13 is less likely to increase the processing load in the logging process. In addition, time-series data of the device values can be generated from the collected data.

In the embodiment, the PLC 100 includes the log storage 130, but the structure is not limited to this example. The PLC 100 may eliminate the log storage 130 and record the logs into a storage included in another device. For example, the PLC 100 transmits log data to another device through a network.

In the embodiment, the PLC 100 includes the device memory 110, but the structure is not limited to this example. The PLC 100 may record the logs in a device memory included in another device. For example, the PLC 100 may receive device values from another device through a network. The PLC 100 may read the device values recorded in a memory shared with another device through a network.

In the embodiment, the PLC 100 records logs when the END command in the control program is executed, but the structure is not limited to this example. For example, the PLC 100 may record logs before the I/O refresh performed before the first command in the control program is executed.

In the embodiment, the collective logger 140 and the split logger 150 record the device name, the device value, and the scan count as the logs, but the logs are not limited to the examples. For example, the collective logger 140 and the split logger 150 may record time information at the scan time as a log in addition to the device name, the device value, and the scan count.

Examples of a non-transitory recording medium that records the above programs include a non-transitory computer-readable recording medium, such as a magnetic disk, an optical disk, a magneto-optical disk, a flash memory, a semiconductor memory, and magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

N Split count
11, 51 Memory
12, 52 Connection interface
13, 55 CPU
19, 59 Bus
53 Input device
54 Display device
100 Programmable logic controller (PLC)
110 Device memory
120 Setting information storage
130 Log storage
140 Collective logger
150 Split logger
160 Differential logger
500 Setting tool
510 Setting registerer
701 Communication cable
1301 Full data area
1301A Collection target device storage area
1302 Differential data area

The invention claimed is:

1. A programmable logic controller for cyclically executing a control program, the programmable logic controller comprising:
   a differential logging circuit to collect, from a device storage to store device values including an input value and an output value for the control program, a device value that has changed among device values set as collection targets from the device values in the device storage at each execution of the control program, and to store a differential log being a log of the collected device value into a differential log storage;
   a collective logging circuit to collect a determined number of data pieces at a time, from the device storage, for the device values set as collection targets from the device values in the device storage at a set time as reference data to be used to collect the differential log, and to collectively store logs of the collected device values into a reference data storage; and
   a split logging circuit to acquire as split logs, after the set time, logs of the device values multiple times, and to store the split logs into the reference data storage,
   wherein
   the split logging circuit stores the split logs into the reference data storage multiple times to store new reference data into the reference data storage,
   after the new reference data is stored into the reference data storage, the differential logging circuit overwrites a differential log that was stored in the differential log storage prior to generation of the new reference data with a new differential log corresponding to the new reference data, and
   the split logging circuit determines the number of data pieces for device values collected at a time based on a set N value and a number of data pieces for device values stored in the device storage and a data size of each of the data pieces for the device values.

2. The programmable logic controller according to claim 1, wherein
   the set time is before the control program starts being executed.

3. The programmable logic controller according to claim 1, wherein
when (i) a latest device value included in the differential log stored in the differential log storage differs from a corresponding device value stored in the device storage or when (ii) a device value included in the reference data differs from a corresponding device value stored in the device storage, the differential logging circuit determines that the device value has changed and stores the differential log of the device value into the differential log storage.

4. The programmable logic controller according claim 1, wherein
the split logging circuit collects, from the device storage, one-Nth of the device values set as the collection targets, where N is a natural number greater than or equal to two, and stores the split logs of the collected one-Nth of the device values into the reference data storage at each execution of a last command in the control program.

5. A setting tool connectable to the programmable logic controller according to claim 1, the setting tool comprising:
a setting registerer to set a value N with the programmable logic controller.

6. A non-transitory computer readable recoding medium storing a program for causing a computer to cyclically execute a control program to perform operations comprising:
storing, into a differential log storage from a device storage to store device values including an input value and an output value for the control program, a differential log being a log of a device value that has changed among device values set as collection targets from the device values in the device storage at each execution of the control program;
collectively storing at a set time, into a reference data storage, a determined number of data pieces collected at a time for the device values set as the collection targets from the device values stored in the device storage as reference data to be used to collect the differential log;
acquiring as split logs, after the set time, logs of the device values multiple times, and storing the split logs into the reference data storage;
overwriting a differential log that was stored in the differential log storage prior to generation of the new reference data with a new differential log corresponding to the new reference data; and
determining the number of data pieces for device values collected at a time based on a set N value and a number of data pieces for device values stored in the device storage and a data size of each of the data pieces for the device values.

7. The programmable logic controller according to claim 1, wherein
the split logging circuit collects, from the device storage, one-Nth of the device values set as the collection targets at each execution of the control program to generate the new reference data, where N is a natural number greater than or equal to two, stores split logs being logs of the collected one-Nth of the device values into the reference data storage, and overwrites data stored in the reference data storage with the split logs of the one-Nth of the device values when no free space is left in the reference data storage.

8. The non-transitory computer readable recording medium according to claim 6, wherein the program is further configured to perform an operation comprising:
collecting, from the device storage, one-Nth of the device values set as the collection targets, where N is a natural number greater than or equal to two, and stores the split logs of the collected one-Nth of the device values into the reference data storage at each execution of a last command in the control program.

9. The non-transitory computer readable recording medium according to claim 6, wherein the program is further configured to perform an operation comprising:
collecting, from the device storage, one-Nth of the device values set as the collection targets at each execution of the control program to generate the new reference data, where N is a natural number greater than or equal to two, stores split logs being logs of the collected one-Nth of the device values into the reference data storage, and overwrites data stored in the reference data storage with the split logs of the one-Nth of the device values when no free space is left in the reference data storage.

* * * * *